United States Patent [19]
Levy et al.

[11] Patent Number: 5,291,550
[45] Date of Patent: Mar. 1, 1994

[54] DYNAMIC NETWORK CALL DISTRIBUTOR

[75] Inventors: Yonatan A. Levy, Manalapan; Rodolfo A. Milito, Highland Park, both of N.J.

[73] Assignee: AT&T Bell Laboratories, Murray Hill, N.J.

[21] Appl. No.: 90,363

[22] Filed: Jul. 9, 1993

Related U.S. Application Data

[63] Continuation of Ser. No. 634,255, Dec. 26, 1990, abandoned.

[51] Int. Cl.⁵ .............................................. H04M 3/36
[52] U.S. Cl. .................................... 379/242; 379/113; 379/134; 379/211; 379/221; 379/265
[58] Field of Search ............... 379/113, 211, 221, 242, 379/265, 266, 309

[56] References Cited

U.S. PATENT DOCUMENTS

| | | | |
|---|---|---|---|
| 4,191,860 | 3/1980 | Weber | 179/18 |
| 4,737,983 | 4/1988 | Frauenthal et al. | 379/221 |
| 4,757,529 | 7/1988 | Glapa et al. | 379/113 |
| 4,788,718 | 11/1988 | McNabb et al. | 379/113 |
| 4,953,204 | 8/1990 | Cuschleg, Jr. et al. | 379/266 |
| 4,988,209 | 1/1991 | Davidson et al. | 379/113 |
| 5,023,868 | 6/1991 | Davidson et al. | 379/211 |
| 5,042,064 | 8/1991 | Chung et al. | 379/113 |

Primary Examiner—James L. Dwyer
Assistant Examiner—Fan Tsang
Attorney, Agent, or Firm—Werner Ulrich

[57] ABSTRACT

This invention relates to a method of distributing calls among a plurality of destinations of a customer. The calls are distributed according to a customer specified policy to maximize revenue or profit, to minimize waiting time or to minimize probability of abandonment. Different types of calls, such as orders, repair requests, and general information requests can be distributed differently. For example, if the criterion is maximizing profit, then calls of the most profitable type may be given preference for completion, while, during a busy period, some of the less profitable calls are rejected.

34 Claims, 4 Drawing Sheets

DYNAMIC NETWORK CALL DISTRIBUTOR

This application is a continuation of application Ser. No. 07/634,255, filed on Dec. 26, 1990, now abandoned.

TECHNICAL FIELD

This invention relates to a method and apparatus for distributing telecommunication calls to destinations of a telecommunication customer having a plurality of call destinations for serving calls.

PROBLEM

Large customers of telecommunication and telemarketing services have facilities such as private branch exchanges (PBXS) and automatic call distributors (ACDs) across the country for receiving and processing calls. The purpose of a network call distributor is to distribute calls to various destinations. A can distributor makes decisions based on a routing algorithm or rule.

Some prior art call distributors distribute calls based on a static rule, such as a fixed percentage allocation of calls per facility. This presents a problem because conditions in the telecommunications network often change. A static rule distribution method does not adjust to changes in the network. Further, some prior art call distributors use distributed routing control, wherein only partial information is available at each routing control point. Thus, a problem with the prior art is that calls are not distributed effectively.

Customers of telecommunication and telemarketing services also have classes of calls that are "more revenue producing" than others. For example, a sales order call is more revenue producing than a customer service call. Prior art call routing distributors distribute calls without regard to the revenue producing class. Thus, another problem with the prior art is that calls are not distributed with a customer's economical benefit in mind.

One prior art solution to the problem of routing calls to one of a plurality of destinations of a terminating customer is presented in U.S. Pat. No. 4,191,860, Data Base Communication Call Processing Method, issued Mar. 4, 1980, of R. P. Weber. This patent discloses an arrangement for routing inbound calls such as Inward Wide Area Telephone Service (INWATS) (800) or 900 calls to ones of a plurality of destinations based on the geographic location of the caller, the plurality of destination sites and the load status of each of the latter. The load status is an indicator of whether the number of calls in progress to each of these sites exceeds a predefined threshold.

Another prior art solution is that presented in U.S. Pat. No. 4,737,983, Automatic Call Distributed Telephone Service, by J. C. Frauentlial et al. This patent discloses an arrangement whereby each of the sites periodically transmits a message to an update processor specifying the length of call queues in each of these sites. Based on the length of these queues, the update processor assigns new incoming calls to an appropriate site with the objective of minimizing the expected delay for that call. The update processor decides for each interval, an interval being typically 30 seconds, which site should receive calls during the next interval. This information is transmitted to a network control point which actually allocates calls to that site in response to this information.

Neither of these arrangements fully utilizes the capability of the network to route calls based on real-time information to the optimum destination. For example, in the case of the Weber solution a call might be routed to a destination site which has maximum queue length, as a result of which the callers are subjected to a substantial wait while other sites may be relatively idle and if the callers were routed to these alternate sites they would incur no wait. In the Frauenthal arrangement, there is substantial delay between the time that the optimum site is calculated and the time that a call is actually routed to this site with the result that the "optimum site" may be far from optimum at the time that the call is actually routed there. Further, neither of these arrangements differentiates among classes of calls to give preferred treatment to certain classes, although in the past priority arrangements have been superimposed on other arrangements with the result that priority calls are simply placed at the head of the queue in any site receiving the priority call. In summary, a problem of the prior art is that there is no optimum arrangement for routing of calls to customers having a plurality of destinations.

SOLUTION

The problems of the prior art are solved and an advance is made in the art by providing a call distribution using dynamic network occupancy information in one or more centralized intelligent nodes, each customer served by only one centralized node, of a telecommunications network along with customer provided routing parameters. In a departure from the art, real-rime dynamic data in the network is used to select a call destination. Advantageously, calls are distributed efficiently because the call distributor can respond to changing conditions in the customer network. In a further departure from the art, the call distributor separates calls to a given customer into classes based on customer provided information such as revenue producing potential. Advantageously, calls are distributed, for example, for maximum profit for the customer.

In accordance with the present invention, a dynamic routing arrangement is implemented. A dynamic routing arrangement is one for implementing a dynamic routing law which performs the following function: given that a call belongs to one of a plurality of classes and arrives when the system is estimated to be in a given state, then the call should be routed to a destination site defined by the state and the class. In other words, the routing law can be viewed as a black box that accepts call classes and system states as inputs and provides destination sites as outputs.

In accordance with one specific implementation of the invention, dynamic customer network occupancy information is continuously accumulated at a centralized (for this customer) intelligent node, for serving the customer, of a telecommunications network. In a departure from the art, the real-time dynamic data in the network is used to determine the best destination for each call. Advantageously, calls are distributed efficiently because the call distributor responds immediately to changing conditions in the customer network as well as to variations in the number of calls enqueued at each site. Changes in the customer network include changes in the number of servers and the service time per call. In a further departure from the art, the call distributor separates calls into a plurality of classes and bases its decisions as to where a call should be routed on the class. One special example of a division of calls into different classes is that based on the expected revenue for different types of calls (for example, calls to place orders and calls to receive general information). For example, if a customer is very heavily loaded, a decision may be made to reject a call, which could be completed, if the call is a low revenue or otherwise a low priority type of call.

In accordance with another aspect of the invention, the customer has the ability to specify a policy for processing calls. The policy defines different classes of calls and their relative treatment including such items as the maximum queue length to which each class should be subjected, and parameters to define the level of loading at which each of the classes of calls is to be rejected. In addition, different kinds of parameters may be provided including the expected revenue for each class of call and the cost of processing each class of call in order to provide information so that the distributor may route calls to the optimum site or reject calls under the restraint of maximizing revenues.

The exemplary embodiment of the present invention is a dynamic network call distributor (DNCD). The DNCD has two modules: (1) the DNCD policy maker which resides on customer premises and comprises software that maps customer provided cost, revenue, and system data into routing parameters; and (2) the DNCD routing controller which resides in the intelligent node of the telecommunications network, and uses an algorithm that routes calls according to their class, the routing parameters, the customer policy, and the number of calls in progress at various locations.

In an alternative embodiment, the basic data is provided by the customer and the routing parameters are calculated therefrom in the DNCD routing controller or are calculated by a service company and transmitted therefrom to the DNCD controller. This simplifies customer equipment but may limit customer control.

Dynamic Network Call Distributor (DNCD) strikes a balance between two conflicting needs: the need to base the decisions on real-time information, and the need to keep the information flow at a manageable level. This is accomplished by a new concept that splits the functionality of the DNCD into two modules: the policy is determined at customer premises, while the actual decisions are taken at the NCN (Network Control Node).

The Dynamic Network Call Distributor (DNCD) addresses among other needs, the need to enhance inbound services with a weighted load balancing traffic routing to customer premises, in order to get the highest possible percentage of call completions. The term load balancing is defined as a fair distribution of the traffic load among the various customer premises. For each customer, there exists a variety of 800 calls, identified by the called 800 number. (For convenience, the term 800 number is used, but 900 number calls can be treated similarly.) They come from different regions, as specified by their NPA. All 800 calls are grouped in a certain number of classes. Membership in a class is defined in terms of the 800 number including optional additional digits supplied by a caller, and may also be based on the caller's NPA code. The term weighted comes into the picture because of customers' need to discriminate between different classes of 800 calls: depending on the expected revenues associated with a particular call, for example, customers may, or may not, be willing to pay the extra cost of routing to a remote location. Affinity of certain classes for some specified locations may also be based on staffing considerations (attendants talking a particular language, knowledgeable about a particular topic, or better trained to handle certain situations).

The information pattern available to the network control node (NCN), which is the only decision maker for the DNCD, is
 (1) Centralized
 (2) Dynamic
 (3) Imperfect (only partial, delayed information is available from customer premises)

Customers determine the routing strategy at their premises, and send the NCN the routing parameters. The call distribution function is network based, in the sense that the NCN executes the routing actions, based on the routing parameters received from customer premises, and available traffic information. Advantageously, calls are routed efficiently.

A multi-class, revenue driven strategy is one of the options that can be followed. Routing parameters reflect customer's expected revenues and costs, which depend on the class of the call, as determined by its origination location and the called 800 number. Therefore, high revenue calls get higher priority than low revenue ones. Advantageously, calls are routed economically.

Accordingly, this invention relates to a method of selecting one of a plurality of destinations of a customer for connection of a call via a network to a caller originating one of a plurality of types of calls to the customer by maintaining a record of the number of calls connected to each destination and, using that record, the call type, and routing parameters based on information provided by the customer, selecting the destination.

DETAILED DESCRIPTION

The key attributes that characterize a routing algorithm can be classified as follows:
(I) Goals: Some common, non mutually exclusive, goals are
 (a) Delay minimization
 (b) Routing cost minimization
 (c) Throughput maximization
(II) Information pattern:
 (a) Centralized vs. distributed
   Centralized: Routing decisions are made based on global network information.
   Distributed: Only local information is made available to the node that makes the routing decision.
 (b) Static vs dynamic
   Static: Only a priori information, e.g. traffic rates, is available. It typically leads to probabilistic routing.
   Dynamic: The information available evolves over time, reflecting the state of the network. Depending on the frequency of the information updates, it can be further classified in:

(i) Periodic updates: The information is updated periodically. A routing strategy is chosen at the beginning of the period and maintained throughout it.

(ii) Arrival driven updates: Fresh information is made available as a new call arrives. It allows routing on a call by call basis.

(c) Perfect vs imperfect

Perfect: Accurate, instantaneous information is available.

Imperfect: The information is either incomplete, or noisy, or available after some delay.

Figure 1:
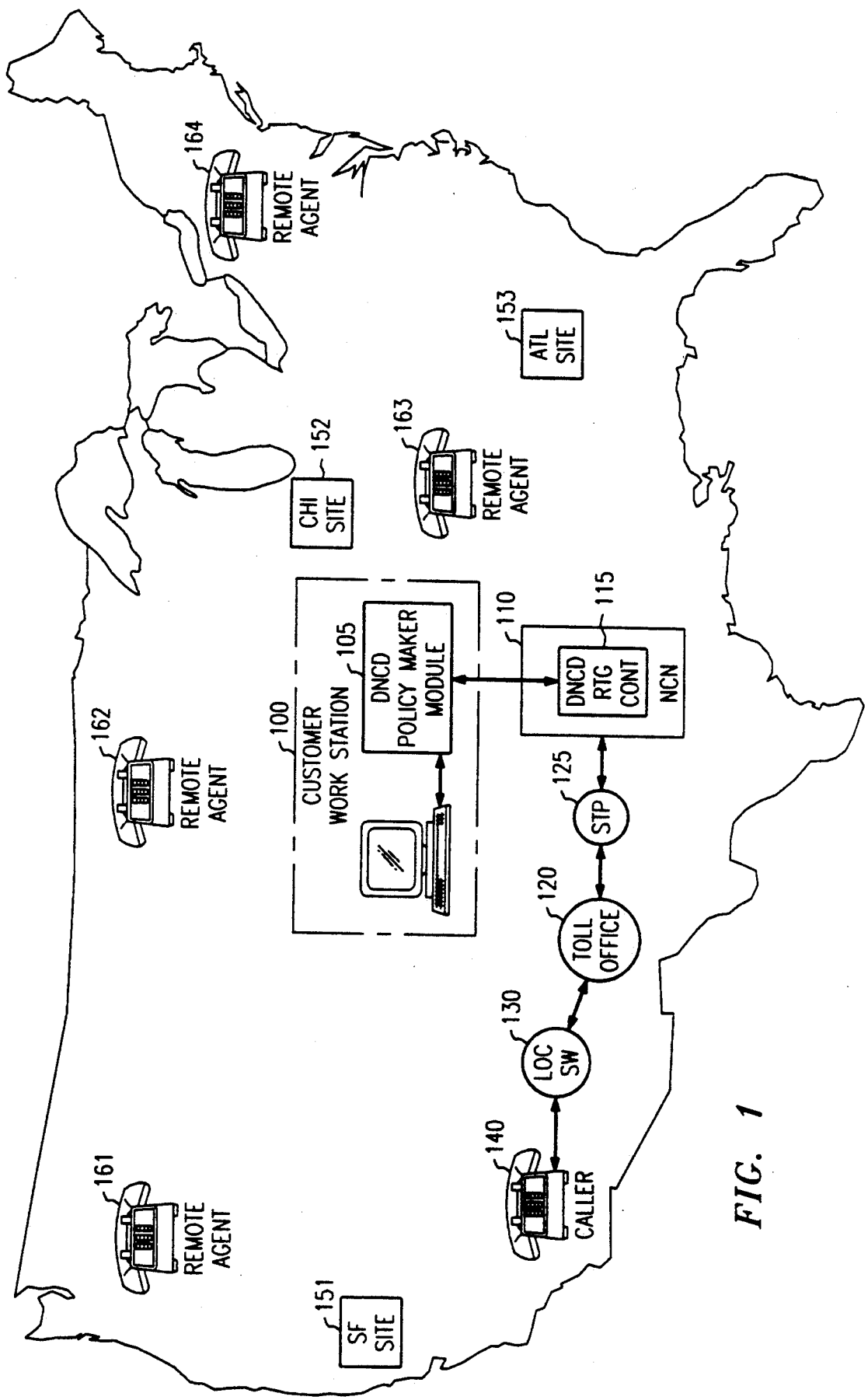
FIG. 1 is a diagram of a large telecommunications network.

FIG. 1 is a diagram of a telecommunications network of a large customer. The network comprises three call center sites, located in San Francisco (SF) 151, Chicago (CHI) 152 and Atlanta (ATL) 153, and four remote agents 161, 162, 163 and 164. The network further comprises a customer work station (CWS) 100, the host of the DNCD Policy Maker Module 105. The DNCD Policy Maker Module receives information from the customer and formulates a routing policy and calculated routing parameters based on that policy that are sent to the DNCD Routing Controller 115, located in a Network Control Node (NCN) 110 which might be part of the telecommunications network, or might be partly or fully owned by a customer. When a caller 140 places a call to the customer, the call goes through a local switching system 130 to a toll switching office 120. The toll office 120 sends a message requesting routine information for the call through a signal transfer point 125 to the NCN 110. At the NCN 110, the DNCD Routing Controller uses the routing policy, routing parameters, and loading information for each customer location to make a routing decision for the call. The call can be routed to any one of the three call center sites 151, 152 or 153, or to one of the remote agent sites 161, 162, 163, and 164. The remote agents can be considered isolated sites by the DNCD or as a single site or pool of agents.

Under the DNCD, 800 calls are dynamically routed to the preferred location. Unlike sequential routing schemes, preference is based on both a priori customer information and the state of congestion of different alternate customer locations.

To illustrate this point, consider the following scenario in FIG. 1:3 potential customer destinations 151, 152 and 153, and 3 different classes of calls a, b, c. Suppose that the minimum cost destination is the SF site 151 for class a, the CHI site 152 for class b and the ATL site 153 for class c. In a sequential routing scheme, if location the SF site 151 is busy, a class a call is routed to the CHI site 152, and only if the CHI site 152 is also busy is the call routed to the ATL site 153. Suppose that the arrival stream of class a creates congestion at the SF site 151, the arrival rate of class b is moderate to high, and the arrival rate of class c is low. In a sequential routing scheme, a good portion of class a calls will be routed to the nearby congested CHI site 152, while attendants at the ATL site 153 might be free. As a result of it, some b class calls will be routed to the ATL site 153. Therefore, extra transport cost is incurred. Even worse, destination CHI site 152, which is capable of handling its primary load with a reasonable delay, might be forced into a heavy load situation, likely to generate a high abandonment rate. The approach taken by DNCD avoids this anomaly by sending calls to the preferred destination, which, in this case, would be the ATL site. Here, preferred destination is the one that better meets the ultimate goal of maximizing revenues, given the constraints imposed by the customer and the actual state of the network.

Figure 2:
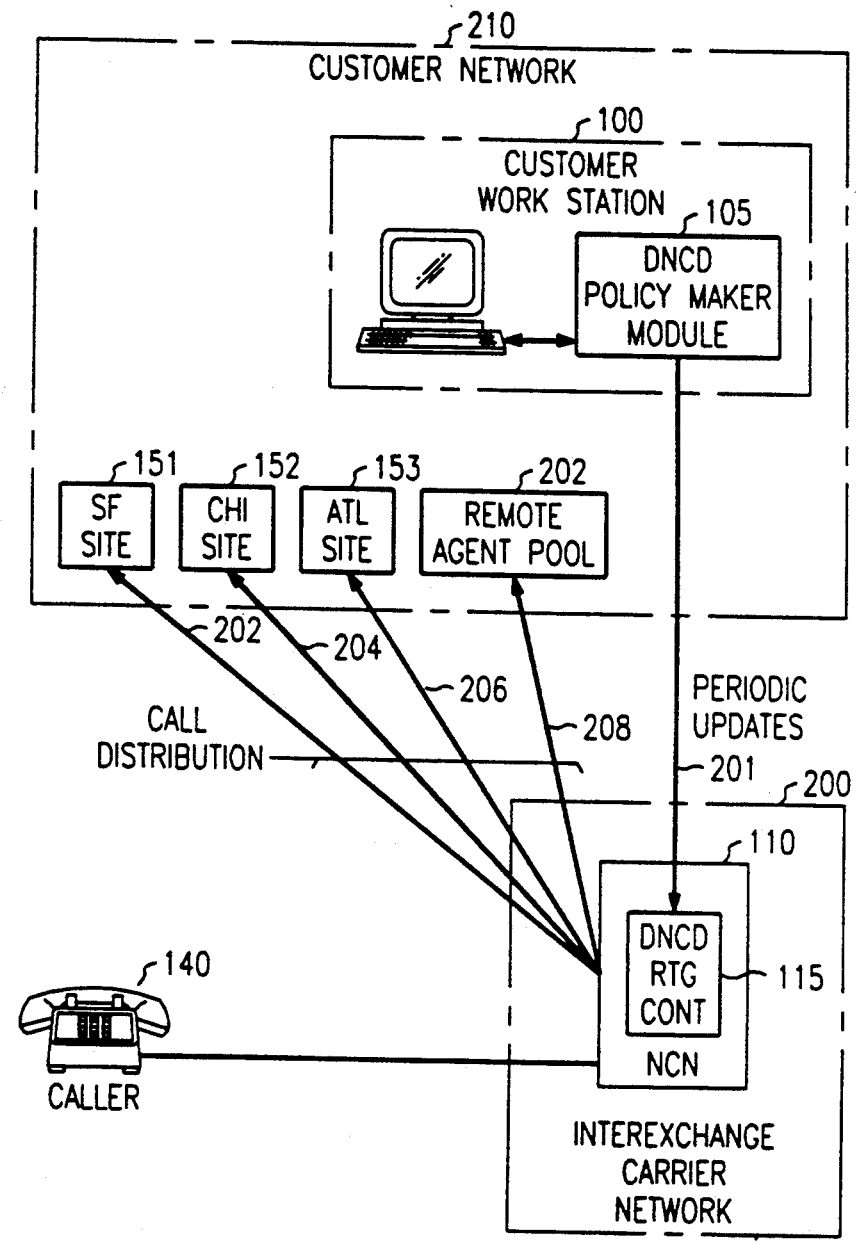
FIG. 2 is a diagram illustrating the interaction between various elements of the network.

FIG. 2 is a diagram illustrating the interaction between various elements of the network. The customer network 210 comprises call center sites 151, 152, 153, a remote agent pool 202, and a customer work station (CWS) 100. The DNCD Policy Maker Module 105 resides in the CWS 100. The Policy Maker 105 formulates the routine policy and routing parameters. The CWS 100 sends periodic updates to the DNCD Routing Controller 115 to reflect that routing policy and such changing parameters as those affected by the number of agents currently active at each location. When a caller 140 places a call to the customer, the call is processed through the Interexchange Carrier (IC) Network 200 to the NCN 110. The Routing Controller 115 in the NCN makes the decision to route the call to one of the call center sites 151, 152, 153 or to a remote agent in the remote agent pool 202.

The DNCD explicitly separates the strategic process of policy making from the act of actual implementation of the routing strategy. Policy making means mapping goals into routing laws. Actual implementation means using these routing laws to map state information into actual routing.

The DNCD places the policy making in customer premises (and hands), and the actual implementation in the exemplary network of this description, the ASN (AT&T Switched Network). Its main features are: (a) Dynamic nature: the actual decisions will be based on current estimates of the state of the network. (b) Robustness: the design will emphasize simplicity. In particular, it will not rely on very frequent information updates from customer premises. Also note that customers' updates will refer to very specific parameters, admitting simple consistency checks. (c) Flexibility: customers will be able to change their information at will. They will be able to test the algorithm off-line in different traffic scenarios, so that a good deal of confidence and understanding can be developed.

Before describing the policy maker and routing controller, a simple example of the DNCD is detailed to illustrate the basic concepts. An example policy is to maximize call completions. This is a policy which is effective if all classes of calls are treated as being equally important, for example by producing equal profit. It is assumed in this case that routing costs are the same or essentially the same for all destinations.

Derivation of a Basic Routing Policy

I The purpose of the DNCD then is to distribute the traffic of an 800 customer with multiple destinations in order to maximize call completions. For ease of reference, we start with the definitions of a few parameters of interest. Some of the quantities, e.g., calls in progress (CIP), vary over time. To simplify the notation, we will not denote this explicitly.

Notation: N = number of 800 terminations available $b_i$ = buffer size at termination i $q_i$ = number of calls queued in termination i, i--1, 2,...N h = average holding time of a call $D_{adm}$ = set of admissible terminations (i.e., temiinations to which the customer is willing to have the call routed to) $dm_{,,x}$ = maximum tolerable queueing delay (beyond this point the probability of abandonment becomes non-negligible) $s_i$ = effective number of attendants in termination i dedicated to 800 traffic (the available pool of attendants deflated by the average number busy with other traffic) $L_i$ = number of lines available at termination i $MCTI$ = Maximum Calls Threshold = maximum calls allowed to termination i so that the average delay does not exceed $d_n$, $MCAI$ = min ($L_i$, $s_i + b_i J$ = maximum number of simultaneous calls to termination i as dictated by facilities and software limitations.

Although all the above parameters are available at the CWS, the routing policy is defined by the set of thresholds $\{MCA_i\}$ and $\{MCT_i\}$, and only these are sent to the NCN. Note that $MCA_i$ is the physical limit on the number of simultaneous calls, and that it is independent of the traffic. Hence, at any time $CIP_i \leq MCA_i$. Also note that any performance oriented limit will be captured by $MCT_i$.

Thresholds and the Information They Convey

While $MCA_i$ is the absolute, facility-based limit, $MCT_i$ is a threshold based on site parameters. It follows from the above definitions that the number of calls queued at termination i can be estimated by $$q_i = \begin{cases} CIP_i - s_i & \text{if } CIP_i \geq s_i \\ 0 & \text{otherwise.} \end{cases} \quad (1)$$

In order to avoid excessive delays that result in high abandonment rates, customers may want to limit the number of calls queued at their terminations so that the mean waiting time at a queue does not exceed a customer-specified $d_{max}$. The value of $d_{max}$ may depend on the load. It is reasonable to assume that customers choose a higher value of $d_{max}$ during heavy traffic, than they do during light traffic. However, as will be pointed out later, the choice of $d_{max}$ does not impact the behavior of the DNCD. Note that $s_i/h$ gives the mean removal rate of calls from the queue due to attendant activity, given the usual assumption that the resident holding time of a call is independent of the length of time that the call is already in progress; for other assumptions $$\frac{s_i}{h}$$

is still a reasonable approximation. Customers will have little trouble in estimating the average holding time h, since this is a standard measurement in most ACDS. Sometimes a pool of attendants serves local traffic, in addition to 800 calls. In these situations, customers should subtract the average load of local calls from the total number of agents, to get the estimates $s_i$. An estimate will suffice, given that properly designed dynamic routing algorithms are robust in the face of parametric perturbations. Based on the above, a proper specification of the set of $MCT_i$ values is $$MCT_i = s_i + d_{max} s_i / h. \quad (2)$$

If thresholds are supposed to be integers, equation (2) should be read as $MCT_i = s_i + \lfloor d_{max} s_i / h \rfloor$, where $\lfloor a \rfloor$ stands for the largest integer not bigger than a.

Equation (2) says that the maximum calls threshold (ignoring the limitations posed by the number of lines and buffer sizes), should be chosen as the number of attendants plus a fraction thereof given by the ratio of the admissible delay to the mean holding time.

Derivation of a Basic Routing Law

We now show a derivation of a basic routing law, which is based on the thresholds MCA and MCT (which are sent from the CWS) and real-time counts, $CIP_i$ (calls in progress) which are accumulated at the NCN.

The average waiting time in queue, as seen by an arrival at termination i, is (approximately) given by $$d_i = \begin{cases} h\left[\frac{CIP_i + 1}{s_i} - 1\right] & \text{if } CIP_i \geq s_i \\ 0 & \text{otherwise.} \end{cases} \quad (3)$$

The routing rule that maximizes call completions, subject to the limitations imposed by the set of admissible terminations, is Route to termination $i^*$, where $$i^* = \underset{\{i:i \in D_{adm}\}}{\arg\min} \{d_i\}. \quad (4)$$

Straightforward manipulations, and consideration of the restrictions imposed by MCAS, lead to Route, if possible, to termination $i^*$ where $$i^* = \underset{\{i:i \in D_{adm}, CIP_i < MCA_i\}}{\arg\min} \left(\frac{CIP_i + 1}{MCT_i}\right). \quad (5)$$

If no value of $i^*$ is permissible, give the call final treatment, such as an announcement or a busy signal.

The optimization implied by rule (5) is sequential in nature; i.e., two candidates are compared, and the winner is compared with a third one, and so on. However, the customers do not need to specify sequences.

In the homogeneous case, i.e., when all terminations are alike, this rule boils down to the well known Join the Shortest Queue policy, known to be optimal except in pathological cases. Ward Whitt, "Deciding which queue to join: some counterexamples", Oper. Res. 34, 1986, pp. 55–62.

Several characteristics of this basic rule are: (1) It routes the call to the best destination available at the time, within the admissible set. (2) It is based on information readily available to the NCN: the CIPs, the MCAs the MCTs and the set of admissible terminations. Customers should have no problems in specifying these parameters. (3) It is remarkably simple. There will be no mystery for customers regarding the routing of their calls. They specify the routing parameters on which the rule acts. (4) Its dynamic nature makes this rule very robust, in the sense that its performance does not degrade abruptly due to inaccuracies in the values of CIPs and/or $MCT_i$.

The DNCD Policy Maker

The DNCD Policy Maker Module is a software package that resides on customer premises. The customer can access it, study it, even modify it. Far from being transparent, it is intended to be "owned" by the customer. Three crucial aspects of the DNCD Policy Module are:

(1) Mapping of customer goals into a cost structure:

This phase supposes good customer input. The key idea is to produce a comprehensive set of goals and related parameterized costs that customers can tune to their particular environments. Major inputs to be considered are:

(a) Average revenue generated to the customer (per call) by each class of 800 calls.
(b) Probability of abandonment as a function of queue delay, per 800 class.
(c) Preferred and banned locations per 800 class. (Considerations might be: particular skills only found in certain locations, access to local data bases, etc.).

The classification may range from a soft tilt towards a certain location to a hard constraint, forbidding certain sites for specific classes.

(d) Site parameters: Number of attendants, number of lines, average holding time, etc.
(e) Cost of routing to, and processing at different locations.

(2) Routing policy:

The routing policy maps, for a given cost structure, the state of the network into routing decisions. In line with our desire to have a robust controller, that can live with limited updates from customer premises to the NCN, we devise a constrained algorithm such as the one illustrated above.

Based on a given cost structure (that the customer can modify at will), the policy maker will generate a set of parameters on which the actual routing decisions will be made (at the NCN). This is done by computing the following parameters:

(i) Average holding time per site, which could vary with the call type mix.
(ii) Abandonment for each site, $F_i$, which gives the probability that a caller will abandon on queue, based on a count of calls currently being handled by the site. The function F can be calculated by simulation, mathematical model, or a specific function can be used to accomplish a particular policy (see examples below).
(iii) Call handling limits, which could depend on site and possibly on class. Again, the limits can be used to accomplish a policy (like congestion control strategy below).

Based on the site parameters and the computed parameters, the customer can define the routing policy.

(3) Flow of information from customer premises to the NCN:

The type of routing policy (if available) and the appropriate parameters are sent periodically (for example, every 15-30 minutes) from the CWS to the NCN. Not all the parameters have to be sent every period, as most of them do not change. Additional static routing information is also stored at the NCN. All the records of a given customer reside at a single NCN. The customer has the freedom to update the parameters whenever the scenario changes. Note that the routing policy does not depend explicitly on the traffic intensity. Robustness with respect to traffic intensity variations is a critical consideration in the design of the routing policy, so that the need for updates is not felt unless the scenario changes substantially.

Figure 3:
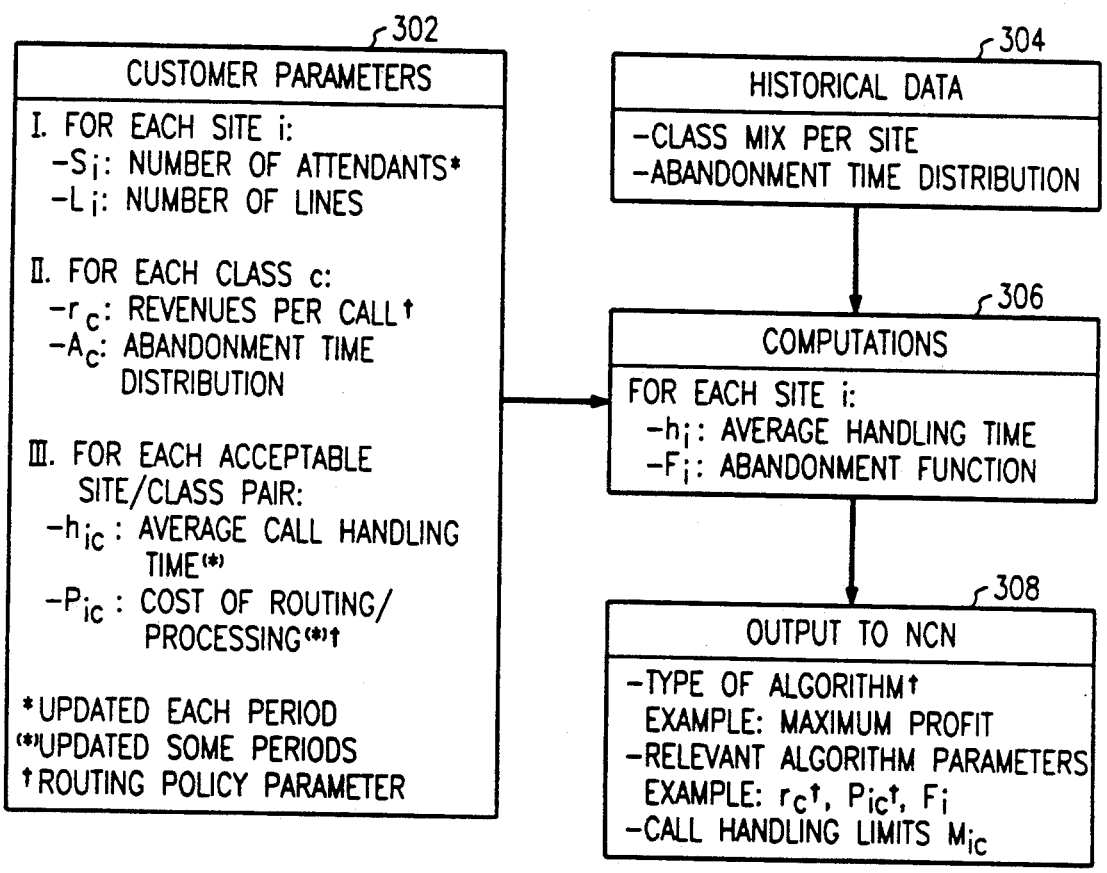
FIG. 3 is an information flow diagram of parameters and data used by the DNCD at the customer premises module.

FIG. 3 is an information flow diagram of sample parameters and data used by the DNCD Policy Maker Module. The following customer parameters 302 are provided by the customer and available at the CWS:

(1) the number of attendants and number of lines for each destination site; (2) the revenue per call and abandonment time distribution for each class of calls; and (3) for each class at each site, the average call handling time and the cost of routing and processing a call. The historical data 304 used by the Policy Maker Module is collected at the CWS and comprises:

(1) the call class mix per call center site; and (2) the abandonment time distribution for calls.

Based on the parameters and data, the Policy Maker Module computes for each site, the parameters 306:

(1) average handling time, h, for each site; (2) an abandonment function, F, which gives the probability that a call will be abandoned based on a count of calls currently being handled by a site; and (3) call handling limits, M, which give the maximum number of calls from a class that can be admitted to a site.

The CWS sends the appropriate parameter 308, along with the type of routing algorithm to be used by the Routing Controller (for example, an algorithm based on maximum revenues) to the NCN.

Examples of Different Routing Policies:

(a) FIG. 3 shows the general multi-class policy, which maximizes expected profit per call. It uses revenues per class, cost per class/site, and an abandonment function. The call is routed to the site which maximizes expected profit for the call. In a typical moderate congestion situation, low revenue calls are likely to be completed to the nearest available site (lowest call transport cost) even if that site currently has a long expected delay. High revenue calls are likely to be sent to the site having the shortest expected delay to minimize the possibility of call abandonment. Intermediate revenue calls will be handled accordingly, by the policy. As congestion increases further, some low revenue calls may be blocked.

(b) If all revenues are the same (no distinction between call classes), routing costs are the same, and the abandonment function F is any monotonically increasing function, the routing policy becomes the simple example discussed above, which maximizes call completion of a single class by routing to the destination with minimum expected delay.

(c) If all revenues are zero, but each site has its own cost, the policy becomes a sequential routing algorithm, which sends calls to the minimum cost destination. The abandonment function is not required in this case.

(d) If all revenues are the same, costs are different for each site, but are much smaller than the revenues, and the abandonment function $F_i$ is zero up to a certain level $L_i$, and then it increases sharply, the routing policy becomes sequential up to a certain queue length, and then it sends to the site with minimum expected delay.

(e) Congestion control strategy: Situations arise in which the offered traffic exceeds the customer capacity. If no action is taken, calls are routed as usual. As a result of long delays a fraction of those calls abandon. Under severe congestion, this fraction can be high. A congestion control strategy alleviates this situation by restricting the traffic admitted at the source. A congestion control strategy for the DNCD is described below.

For every class c define the admissible location set $A_c$ as $$M = \frac{sI}{c} \quad (2)$$

where $N_{ic}$ stands for calls in progress of class c at site i, and $M_{ic}$ is the limit for such calls.

If $A_c = \phi$, i.e., if no feasible destination is presently admissible for a call class i, the call is given final treatment. Two remarks are in place:

(i) The parameters $M_{ic}$ defined by the customer, determine the treatment to be given at site i to class c in heavy traffic. (ii) This congestion control mechanism provides an efficient way to prevent one class, from hogging the resources.

The DNCD Controller

The DNCD Controller resides at the NCN. It receives the routing parameters from the CWS and, based on them and on real-time counters, makes a call-by-call decision as to what the best destination is. We describe next one scenario.

The NCN maintains real-time counts, $N_{ic}$, of the number of calls from class c in site i. For each class c, the admissible set of sites is defined as:

$$A_c = \{i : N_{ic} < M_{ic} \text{ and } N_{i.} < M_{i.}\},$$

where $$N_{i.} = \sum_c N_{ic},$$

and $M_{i.}$ is a limit for all calls in site i.

If $A_c$ is an empty set, the call is blocked. Otherwise, the best destination is determined by minimizing (or maximizing) some objective function over the admissible set. The routing rule (5) is a simple example. A more general rule is shown in FIG. 4.

Figure 4:
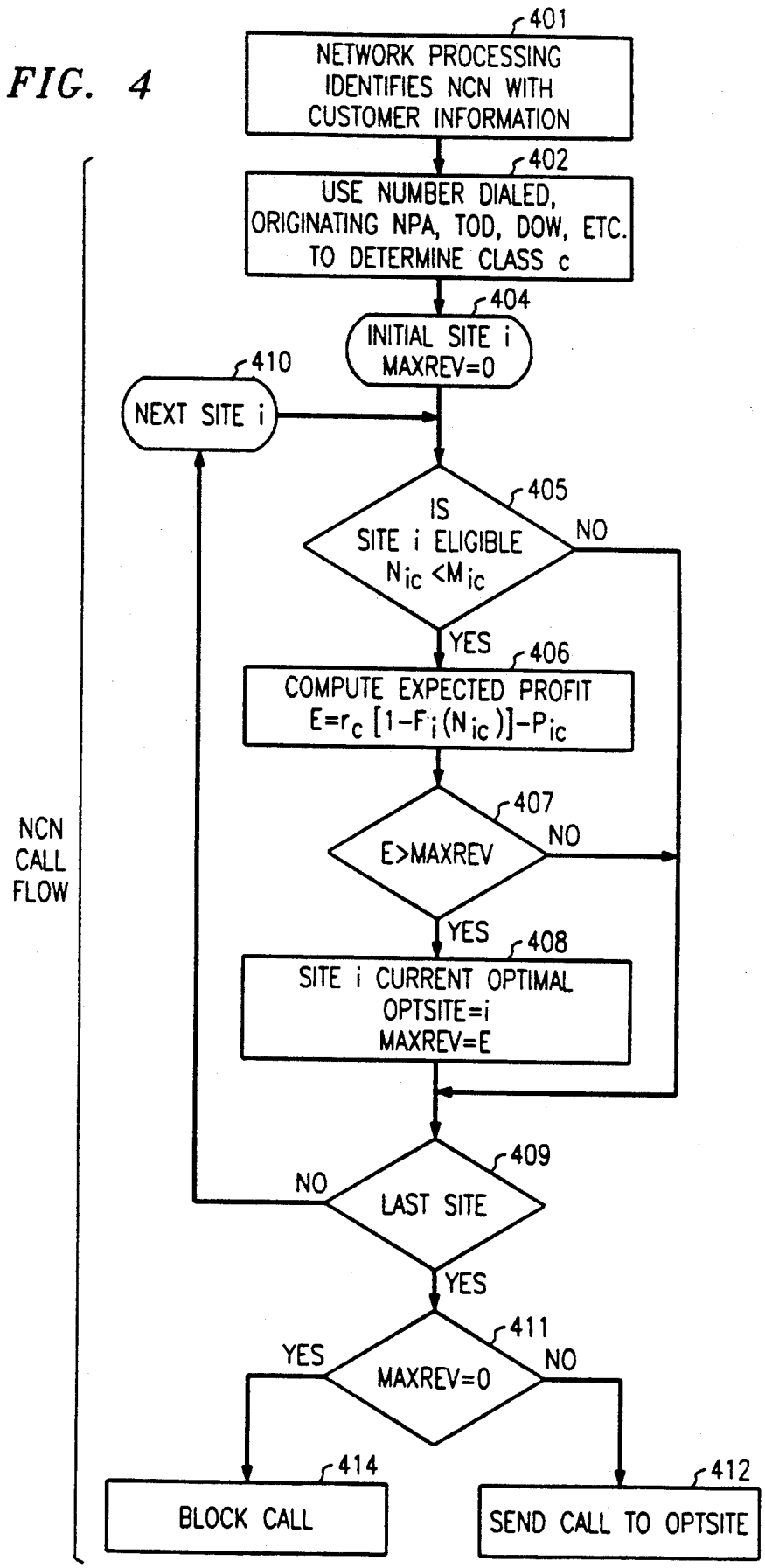
FIG. 4 is a call flow diagram of a call routing procedure at the network control node.

FIG. 4 is a flow diagram of NCN call flow. When a call comes into the network, a network process identifies and sends the call to the appropriate NCN (action block 401). Once the call is received by the NCN, the class of the call is determined (for example, by translating from the 800 number to a POTS (for plain old telephone service) number, as discussed in the Weber patent), and the DNCD Routing Controller takes over (action block 402). In this example, a maximum revenue algorithm is used. The Routing Controller next sets the variable MAXREV to zero for the first call center site considered (action block 404). The Controller next determines if the site is eligible to receive the call by determining whether the number of calls for class c already being handled by the site is greater than the maximum number of calls that can be admitted to the site (test 405). If the site is eligible to receive the call, the Controller next computes the expected revenue of the call at that site (action block 406). If the expected revenue is greater than the variable MAXREV (test 407), then the current site is assigned to be the optimum site, and the variable MAXREV is assigned equal to the expected revenue of the current site. Next, and also if tests 405 or 407 were negative, the controller checks whether the current site is the last possible site (test 409). If the current site is not the last possible site, the controller repeats steps 405-408 for the next possible site. If the current site is the last possible site, the Controller checks whether the variable MAXREV is still equal to zero (test 411). If so, then there is no eligible site, and the call is blocked (action block 414). If MAXREV is not equal to zero, then the call is sent to the site assigned as the optimum site (action block 412).

Some customers have automatic call distributors (ACD) at one or more of their destinations. For such customers, the routing parameters include parameters describing the allocation of types of calls to different ones of the queues of the ACD. For example, one of the queues may receive priority treatment, and a decision must be made, based on the length of that queue, whether to enter the next call of a second most profitable type in that queue or another.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. In a telecommunications network, a method of selecting one of a plurality of destinations for a call from a caller to a customer, each destination comprising apparatus for connecting a call to one of a plurality of agents, said method for connection of said call via said telecommunications network from said caller to said customer, said caller originating one of a plurality of types of calls, comprising:

in a data base of said network, maintaining a record of a number of calls currently connected to each of said destinations, each destination comprising apparatus for connecting a call to one of a plurality of agents;

using said record, a type of said call from said caller to said customer, and routing parameters, said routing parameters based on information provided by said customer for each type of call to said customer, for selecting one of said destinations for connecting said call from said caller to one of a plurality of agents connected by said one of said destinations.

2. The method of claim 1 wherein said customer provided information comprises a cost per call for a call to each destination.

3. The method of claim 2 wherein said customer provided information further comprises a cost per type of call for each destination.

4. The method of claim 2 wherein said customer provided information further comprises revenue information for each type of call and wherein said selecting comprises selecting one of said destinations to maximize an expected net revenue for an average call.

5. The method of claim 1 wherein said maintaining comprises maintaining a record of a number of calls being served at each of said customer destinations.

6. The method of claim 5 wherein said record comprises a queue length and a number of calls being served at each of said destinations.

7. The method of claim 1 wherein said maintaining comprises maintaining a record of a number of calls of each type in progress at each of said customer destinations.

8. The method of claim 1 wherein said routing parameters comprise traffic parameters for rejecting a type of call for a destination.

9. The method of claim 1 wherein said routing parameters comprise traffic parameters for rejecting a type of call for all destinations.

10. The method of claim 1 wherein said customer provided information comprises revenue generated per call for each type of call.

11. The method of claim 1 wherein said record comprises a queue length and a number of calls being served at each of said destinations.

12. The method of claim 11 wherein the customer provided information comprises expected revenue generated per call for each type of call further comprising:
calculating an expected wait at each of said destinations based on said queue length and said number of calls being served; and
calculating an expected probability of an abandonment prior to serving said call;
wherein said step of selecting comprises modifying said expected revenue by said expected probability of an abandonment.

13. The method of claim 11 further comprising:
selecting a destination to minimize an expected waiting time for said call.

14. The method of claim 11 further comprising:
selecting a destination to minimize an expected waiting time for an average call to said customer.

15. The method of claim 11 further comprising:
selecting a destination to minimize an expected waiting time for an average call of said type of said call.

16. The method of claim 1 further comprising the step of:
calculating said routing parameters by said customer in response to a routing policy selected by said customer and data supplied by said customer.

17. The method of claim 1 wherein said information comprises a routing policy.

18. The method of claim 17 wherein said routing policy comprises maximizing profit.

19. The method of claim 18 wherein said information further comprises average revenue for each type of call.

20. The method of claim 19 wherein said information further comprises average cost for each type of call as a function of destination.

21. The method of claim 17 wherein said routing policy comprises minimizing expected waiting time.

22. The method of claim 17 wherein said routing policy comprises minimizing expected waiting time for at least one of said types of calls.

23. The method of claim 17 wherein said routing policy comprises minimizing probability of abandonment.

24. The method of claim 17 wherein said routing policy comprises minimizing probability of abandonment for at least one of said types of calls.

25. The method of claim 1 wherein said information comprises customer parameters.

26. The method of claim 25 wherein said customer parameters comprise data regarding probability of abandonment as a function of waiting time.

27. The method of claim 25 wherein said customer parameters comprise data regarding average holding time for a call to said customer.

28. The method of claim 25 wherein said customer parameters comprise data regarding average holding time for each type of call to said customer.

29. The method of claim 25 wherein said information comprises data relating to the number of attendants at each customer destination.

30. The method of claim 1 wherein said information comprises data relating to the number of attendants at each customer destination.

31. The method of claim 1 wherein said customer has an automatic call distributor (ACD) serving at least one of said destinations and wherein said information comprises ACD parameters for said at least one destination.

32. The method of claim 31 wherein said ACD parameters comprise a parameter specifying a number of servers dedicated to a specified at least one of said types of calls.

33. The method of claim 31 wherein said ACD has a plurality of queues and said ACD parameters comprise parameters specifying priorities, buffer limits, and types of calls for ones of said plurality of queues.

34. The method of claim 31 wherein said information comprises information describing service disciplines for said at least one of said destinations.

* * * * *